United States Patent Office 3,153,670
Patented Oct. 20, 1964

3,153,670
VINYL AMINES
Angelo John Speziale, Creve Coeur, and Robert C. Freeman, St. Louis, Mo., assignors to Monsanto Company, a corporation of Delaware
No Drawing. Filed Mar. 16, 1962, Ser. No. 180,311
18 Claims. (Cl. 260—570.5)

This invention relates to new chemical compounds and an unusual method for their preparation. More specifically, the invention relates to the preparation of halogen substituted amines from halogenated carboxylic acid amides, involving a rearrangement of halogen atoms.

In accordance with this invention it has been found that acid amides of a specific configuration can be rearranged by the action of a tertiary phosphine or a triester of phosphoric acid to form vinyl amines.

The new vinyl amines prepared in accordance with the novel procedure will have the structure

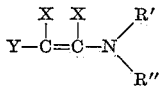

wherein each X substituent is selected from the class consisting of the chlorine and bromine atoms; wherein each of the R' and R" radicals is selected from the class consisting of aliphatic hydrocarbon radicals having up to 12 carbon atoms, cycloaliphatic hydrocarbon radicals having from 5 to 7 carbon atoms, phenyl, benzyl, radicals such that R' and R" together comprise an alkylene radical of five to seven carbon atoms, an alkylene hydrocarbon radical of 5 to 8 carbon atoms including at least one oxa group, and said hydrocarbon radicals containing substituents selected from the class consisting of nitro, cyano, alkyl radicals having up to four carbon atoms, alkoxyl radicals having up to four carbon atoms, chlorine and bromine; and wherein Y is a substituent selected from the class consisting of hydrogen, chlorine, bromine, fluorine, alkyl radicals having one to four carbon atoms, and the phenyl radical, provided that when Y is selected from the class consisting of hydrogen and alkyl radicals of up to four carbon atoms, no more than one of the R' and R" radicals is an aliphatic radical.

In effecting this reaction the acid amides must have the structure

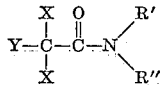

wherein the symbols are defined with respect to the above products.

The reactions are conducted in the presence of a tertiary phosphine or a triester of phosphorous acid. These reagents may be represented by the general formula

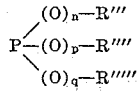

wherein $n$, $p$ and $q$ are each the same or different integers from zero to one, and wherein R''', R'''' and R''''' are the same or different radicals selected from the group consisting of the aliphatic hydrocarbon radicals having up to 12 carbon atoms, the cycloaliphatic hydrocarbons having from 5 to 7 carbon atoms; the aromatic hydrocarbon radicals selected from the class consisting of phenyl and naphthyl, and the said hydrocarbon radicals having substituents selected from the class consisting of chlorine, bromine, nitro, cyano, alkyl radicals having up to four carbon atoms and alkoxy radicals having up to four carbon atoms. The structure of the trivalent phosphorus compound is not critical as long as it is taking up oxygen from the amide. Either the tertiary phosphines or the triesters of phosphorous acid have this property.

A general reaction may be represented by the equation

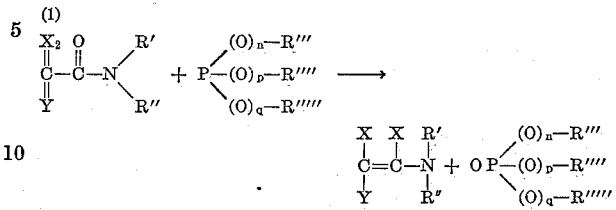

The above reaction can be carried out by reacting the substituted trihaloacetamides with a stoichiometric equivalent amount of the trivalent phosphorus compound. An excess of the phosphorus compound may be employed such that the molar ratio of phosphorus compound to the haloamide approaches 2:1 but the reaction products and yields remain substantially the same. An excess of the amide may also be used but lower yields of the desired product will be obtained.

The reaction is preferably carried out at a temperature which is within the range of 50° to 170° C. If higher temperatures are used, decomposition of some desired trichlorovinylamines may occur. However, the reaction may take place outside of the temperature range given above depending upon the particular trichloroacetamide and phosphorus compound used.

It is to be understood that the process of this invention is of a general nature and that a large variety of novel trichlorovinylamines may be synthesized through application of the present invention including the following:

1,2,2-trichloro-N-ethyl-N-phenylvinylamine,
1,2,2-trichloro-N-propyl-N-hexylvinylamine,
1,2,2-trichloro-N-ethyl-N-3-ethoxypropylvinylamine,
1,2,2-trichloro-N-methyl-N-allylvinylamine,
1,2,2-trichloro-N-(3-cyclohexenyl)-N-phenylvinylamine,
1,2,2-tribromo-N-dodecyl-N-4-bromophenylvinylamine,
1,2,2-trichloro-4-(N-phenylpiperidino) ethylene,
1,2,2-trichloro-N-pentyl-N-tetradodecylvinylamine,
1,2,2-trichloro-N-nonyl-N-(3-dimethylaminopropyl) vinylamine,
1,2,2-trichloro-N,N-dipropargylvinylamine,
1,2,2-trichloro-N-octyl-N-propargylvinylamine,
1,2,2-trichloro-N-heptyl-N-2-chloroallylvinylamine,
1,2,2-trichloro-N-(3-chlorobutnyl)-2)-N-phenylvinylamine,
1,2,2-trichloro-N-(1-chloro-3-cyclohexenyl)-N-2-naphthylvinylamine,
1,2,2-trichloro-N,N-diethylvinylamine,
1,2,2-trichloro-N,N-dihexylvinylamine,
1,2,2-trichloro-N,N-didodecylvinylamine,
1,2,2-trichloro-N,N-diphenylvinylamine,
1,2-dichloro-N,N-bis(2-nitrophenyl) vinylamine,
1,2,2-trichloro-N,N-bis(1-chloronaphthyl) vinylamine,
1,2,2-trichloro-N,N-bis(4-cyanophenyl) vinylamine,
1,2-dichloro-N,N-dicyclohexylvinylamine,
1,2,2-trichloro-N,N-bis(2-chlorocycloheptyl) vinylamine,
1,2,2-trichloro-N,N-bis(2-methoxyphenyl) vinylamine,
1,2,2-trichloro-N,N-bis(4-chlorophenyl) vinylamine,
1,2,2-tribromo-N,N-diamylvinylamine,
1,2,2-trichloro-N,N-diallylvinylamine,
1,2,2-trichloro-N,N-bis(2-ethoxyethyl) vinylamine,
1,2,2-trichloro-N,N-bis(3-carboethoxypropyl) vinylamine,
1,2,2-trichloro-N,N-bis(3-propoxypropyl) vinylamine,
1,2,2-trichloro-N,N-bis(3-chloroallyl) vinylamine,
1,2,2-trichloro-N,N-bis(2,3-dichloroallyl) vinylamine,
1,2,2-tribromo-N,N-bis(4-bromophenyl) vinylamine,
1,2,2-trichloro-N,N-bis(4-biphenylyl) vinylamine,
and the like.

The following examples serve to illustrate the novel compounds of this invention and their preparation.

EXAMPLE I

*1,2,2-Trichloro-N,N-Diethylvinylamine*

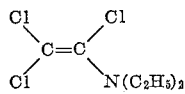

N,N-diethyl 2,2,2-trichloroacetamide (218.5 g., 1 mole) was heated to 145°, with stirring. One mole (166.2 g.) of triethyl phosphite was added to the amide at such a rate that the temperature did not exceed 150°. The addition required 1⅔ hours and the mixture was heated for an additional hour. During the addition period 6.05 g. of ethyl chloride was evolved. An additional 10 g. was caught in a cold trap during the distillation of the trichlorovinylamine. The total yield of ethyl chloride was 16.05 g. and therefore only 0.751 mole of amide was available for conversion to 1,2,2-trichloro-N,N-diethyl-vinylamine. Distillation of the reaction mixture afforded 147.4 g. (96.8% of theory) of 1,2,2-trichloro-N,N-diethylvinylamine, B.P. 67–71° (6.2 mm. of Hg); $n_D^{25}$ 1.4779, based on the amount of ethyl chloride isolated and 72.6% of theory based on the amount of amide charged.

EXAMPLE II

*1,2,2-Trichloro-N,N-Dipropylvinylamine*

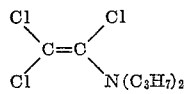

The procedure of Example I was repeated except that 49.8 g. (0.3 mole) of triethylphosphite was added to 74 g. (0.3 mole) of N,N-dipropyl 2,2,2-trichloroacetamide and 20.7 g. (33.4 percent of theory) of 1,2,2-trichloro-N,N-dipropylvinylamine was obtained.

EXAMPLE III

*1,2,2-Trichloro-N,N-Diethylvinylamine*

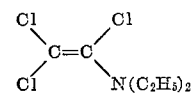

The procedure of Example I was repeated except that 102.1 g. (0.5 mole) of triisopropyl phosphite was added to 109.3 g. (0.5 mole) of N,N-diethyl-2,2,2-trichloroacetamide and 31.5 g. (31 percent of theory) of 1,2,2-trichloro-N,N-diethylvinylamine was obtained. In addition 16.7 g. (14.9 percent of theory) of triisopropyl phosphate was obtained.

EXAMPLE IV

*1,2,2-Trichloro-N,N-Dipropylvinylamine*

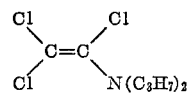

The procedure of Example I was repeated except that 24.8 g. (0.2 mole) of trimethyl phosphite was added to 49.3 g. (0.2 mole) of N,N-dipropyl-2,2,2-trichloroacetamide and 24.0 g. (52 percent of theory based on the amount of starting amide recovered), of 1,2,2-trichloro-N,N-dipropylvinylamine was obtained.

EXAMPLE V

*1,2,2-Trichloro-N,N-Dimethylvinylamine*

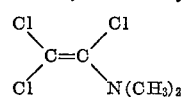

To 109.3 g. (0.5 mole) of N,N-dimethyl-2,2,2-trichloroacetamide there was added 101.0 g. (0.5 mole) of tributyl phosphine under a nitrogen atmosphere. The reaction temperature rose quickly to 55°. By cooling the reaction mixture with ice water, addition was completed in 30 minutes at 55–60° C. The reaction mixture was then heated 1.5 hours at 55–60° after addition was completed. Distillation through a 15 x 150 mm. Vigreux column afforded 52.6 g. (60.3% of theory) of 1,2,2-trichloro-N,N-dimethylvinylamine, B.P. 65–66° (24 mm. Hg), $n_D^{25}$ 1.4948.

EXAMPLE VI

*1,2,2-Trichloro-N,N-Diphenylvinylamine*

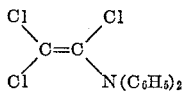

To a solution consisting of 600 ml. of hexane and 68.6 g. (0.218 mole) of N,N-diphenyl-2,2,2-trichloroacetamide heated to 70°, there was added 200 ml. of hexane containing 78.7 g. (0.3 mole) of triphenylphosphine. The hexane-triphenylphosphine solution was warmed in order to maintain a homogenous solution. The addition required one hour after which the reaction mixture was heated (70° C.) two hours. Triphenylphosphine oxide began precipitating immediately after the addition of triphenylphosphine was started. After the heating period the reaction mixture was filtered through a coarse fritted glass funnel. The residue (A) was washed with ether and the washings added to the filtrate. The ether-hexane filtrates were concentrated in vacuo to a solid-oil residue which was triturated several times with boiling petroleum ether (B.P. 38–48°). The solid (B) which remained was mixed with the above residue (A) and dissolved in methanol. Triphenylphosphine oxide M.P. 151–153°, 58.1 g. (69.6 percent of theory) was isolated from the methanolic solution by adding water.

A bright red oil (51.6 g.) was obtained from the petroleum ether solution after distilling the solvent in vacuo. There was obtained from this oil 35.7 g. (55.4 percent of theory) of 1,2,2-trichloro-N,N-diphenylvinylamine, M.P. 49–50°, on recrystallizing from methanol.

EXAMPLE VII

*1,2,2-Trichloro-N,N-Diododecylvinylamine*

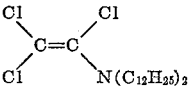

In accordance with the procedure of Example I good yields of 1,2,2-trichloro-N,N-didodecylvinylamine and tricyclohexyl phosphate are obtained from reacting 164.2 g. (0.5 mole) of tricyclohexyl phosphite and 249.5 g. (0.5 mole) of N,N-didodecyl-2,2,2-trichloroacetamide.

EXAMPLE VIII

*1,2,2-Trichloro-N,N-Di-(2-Naphthyl) Vinylamine*

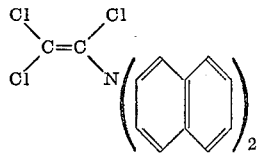

In accordance with the procedure of Example I good yields of 1,2,2-trichloro-N,N-di(2-naphthyl) vinylamine and triisooctyl phosphate are obtained from reacting 82.9 g. (0.2 mole) of N,N-di(2-naphthyl)-2,2,2-trichloroacetamide and 83.7 g. (0.2 mole) of triisooctyl phosphite.

EXAMPLE IX

*1,2,2-Trichloro-N,N-Di-(4-Nitrophenyl) Vinylamine*

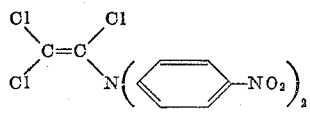

In accordance with the procedure of Example I good yields of 1,2,2-trichloro-N,N-di-(4-nitrophenyl) vinylamine and tri-(4-methoxyphenyl) phosphate are obtained from reacting 200 g. (0.5 mole) of tri-4-methoxyphenyl phosphite and 202.3 g. (0.5 mole) N,N-di-(4-nitrophenyl) 2,2,2-trichloroacetamide.

EXAMPLE X

*1,2,2-Trichloro-N,N-Di-(4-Methoxyphenyl) Vinylamine*

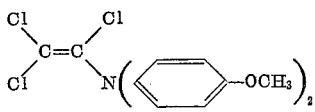

In accordance with the procedure of Example V good yields of 1,2,2-trichloro-N,N-di-(4-methoxyphenyl) vinylamine and triethylphosphine oxide are obtained from 187.8 g. (0.5 mole) of N,N-di-(4-methoxyphenyl)-2,2,2,-trichloroacetamide and 59.1 g. (0.5 mole) of triethylphosphine.

EXAMPLE XI

*1,2,2-Trichloro-1-Piperidino Ethylene*

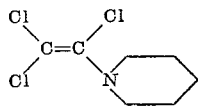

In accordance with the procedure of Example I good yields of 1,2,2-trichloro-1-piperidino ethylene and tri-2-ethylhexyl phosphate are obtained from reacting 125.6 g. (0.3 mole) of tri-2-ethylhexyl phosphite and 69.2 g. (0.3 mole) of 1-(trichloroacetyl) piperidine.

EXAMPLE XII

*1,2,2-Trichloro-N,N-Di-(3,1-Cyanonaphthyl) Vinylamine*

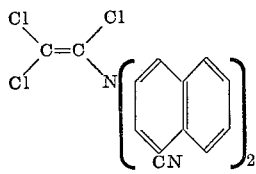

In accordance with the procedure of Example VI good yields of 1,2,2-trichloro-N,N-di(3-1-cyanonaphthyl) vinylamine and dicyclohexylphenylphosphine oxide are obtained from 92.9 g. (0.2 mole) of N,N-di(3-1-cyanonaphthyl)-2,2,2-trichloroacetamide and 54.9 g. (0.2 mole) of dicyclohexylphenylphosphine.

EXAMPLE XIII

*1,2,2-Trichloro-N,N-Di(4-Chlorophenyl) Vinylamine*

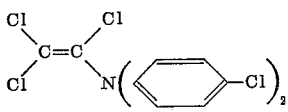

In accordance with the procedure of Example V good yields of 1,2,2-trichloro-N,N-di(4-chlorophenyl) vinylamine and dimethyl-4-methylphenylphosphine oxide are obtained from 191.8 g. (0.5 mole) of N,N-di-4-chlorophenyl-2,2,2-trichloroacetamide and 72.2 g. (0.5 mole) of dimethyl-4-methylphenylphosphine.

EXAMPLE XIV

*N-Methyl-N-Phenyl-1,2,2-Trichlorovinylamine*

A mixture of N-methyl-2,2,2-dichloroacetanilide (50.4 g., 2.20 mole), triphenylphosphine (52.4 g., 0.20 mole) and benzene (200 ml.) was heated at 85° for 2 hr. The benzene was evaporated in vacuo and distillation produced N-methyl-N-phenyl-1,2,2-trichlorovinylamine as a colorless liquid (28.3 g., 0.12 mole, 60%), B.P. 105° (0.5 mm.), $n_D^{25}$ 1.5859.

EXAMPLE XV

*N,N-Diethyl-1,2-Dichloro-2-Fluorovinylamine*

A solution of N,N-diethyl-2,2-dichloro-2-fluoroacetamide (40.2 g., 0.20 mole) and tributylphosphine (40.4 g., 0.20 mole) was heated in a nitrogen atmosphere at 125–130° for 2 hours. Distillation produced N,N-diethyl-1,2-dichloro-2-fluorovinylamine (4.9 g., 0.026 mole, 13%), B.P. 34–35° (4.3 mm.), $n_D^{22}$ 1.4462.

EXAMPLE XVI

*N,N,-Diethyl-α,β-Dichloro-β-Styrylamine*

N,N-diethyl-2,2-dichlorophenylacetamide (5.2 g., 0.02 mole) and tributylphosphine (4.1 g., 0.02 mole) were heated at 100° for 0.5 hour in a nitrogen atmosphere. Distillation produced N,N-diethyl-α,β-dichloro-β-styrylamine (3.3 g., 0.014 mole, 70%), B.P. 110–119° (1.1 mm.), $n_D^{22}$ 1.5504.

EXAMPLE XVII

*N,N-Diethyl-α,β-Dichloro-β-Styrylamine*

A mixture of N,N-diethyl-2,2-dichlorophenylacetamide (10.2 g., 0.04 mole) and triphenylphosphine (10.5 g., 0.04 mole) was heated for 0.75 hour at 110°. Distillation gave a yellow liquid which on redistillation gave N,N-diethyl-α,β-dichloro-β-styrylamine (4.7 g., 0.019 mole, 48%), B.P. 98–103° (0.5–0.6 mm.), $n_D^{22}$ 1.5504.

EXAMPLE XVIII

*N,N-Diphenyl-1,2-Dichlorovinylamine*

A mixture of N,N-diphenyl-2,2-dichloroacetamide (7.0 g., 0.025 mole) and triphenylphosphine (6.5 g., 0.025 mole) was heated with stirring at 125° for 0.5 hour. Distillation gave a yellowish liquid which on redistillation gave N,N-diphenyl-1,2-dichlorovinylamine (5.5 g., 0.021 mole, 84%), B.P. 154–158° (0.5 mm.), $n_D^{22}$ 1.6300.

EXAMPLE XIX

*N-Methyl-N-Phenyl-1,2-Dichlorovinylamine*

A mixture of N-methyl-2,2,2-dichloroacetanilide (10.3 g., 0.047 mole) and tributylphosphine (10.2 g., 0.05 mole) was heated at 100° for 1 hour in a nitrogen atmosphere. Distillation produced a yellow liquid (2.7 g.), $n_D^{23}$ 1.5647. Redistillation gave N-methyl-N-phenyl-1,2-dichlorovinylamine (1.6 g., 0.008 mole, 17%) B.P. 84–89° (1.1 mm.).

EXAMPLE XX

*N,N-Diethyl-1,2,2-Trichlorovinylamine*

A solution of tetrapropylammonium bromide (26.6 g., 0.10 mole) and N,N - diethyl - 2,2,2 - trichloroacetamide (21.9 g., 0.10 mole) in chloroform (150 ml.) was stirred while tributylphosphine (30.3 g., 0.15 mole) was added dropwise in a nitrogen atmosphere. The solution was heated at 85° for 7 hours and then the chloroform was removed in vacuo. Distillation gave two arbitrary fractions, I, 7.5 g., B.P. 25-64° (0.3 mm.), and II, 17.6 g., B.P. 64–130° (0.3–0.7 mm.). Fractions I and II were found to contain less than 1% bromide, if any. Vapor phase and infrared analysis of the fractions showed them to contain N,N-diethyl-1,2,2-trichlorovinylamine.

EXAMPLE XXI

*N,N-Diethyl-1,2,2-Trichlorovinylamine*

A solution of N,N - diethyl - 2,2,2 - trichloroacetamide (21.9 g., 0.10 mole) in chloroform (150 ml.) was stirred in a nitrogen atmosphere while tributylphosphine (30.3 g., 0.15 mole) was added dropwise. The solution was heated at 70° for 3 hours and the chloroform was evaporated in vacuo. Distillation produced N,N-diethyl-1,2,2-trichlorovinylamine (11.5 g., 0.057 mole, 57%), $n_D^{25}$ 1.4864.

It is to be understood that the foregoing examples are by way of illustration and that the reaction of Equation 1 above is extremely broad in its application and scope. It is to be understood that the expression for R, whether R', R'', R''', R'''' or R''''' in Equation 1, contemplates any substituted alkyl, aryl, or cycloalkyl radical wherein the substituent R is nonreactive. This would of necessity not include those substituents where the R is a hydroxy or carboxylic radical due to their reactivity.

The new compounds of this invention find utility as plasticizers and as intermediates in the preparation of highly useful compounds.

By way of example, 1,2,2-trichloro-N,N-diethylvinylamine when incorporated in a general purpose polyester resin consisting of the reaction product of phthalic anhydride (11.0 moles), maleic anyhdride (11.0 moles), and propylene glycol (26.4 moles) as a 15 mole percent replacement for the styrene monomer cross-linking agent, exhibited strong plasticizer properties.

The new compounds are found to be particularly suitable as an intermediate such as in the chlorination of certain compounds to form desired alkyl halides, acyl halides, and the like. For example, in preparing epichlorohydrin, which has a wide utility in the formulating of lacquers and varnishes, it is well known in the art that gylcidol can not be effectively chlorinated with such standard chlorinating agents as PCl₃, PCl₅, or SOCl₂ to form epichlorohydrin. However, by using one of the new class compounds of this invention the reaction takes place readily as follows:

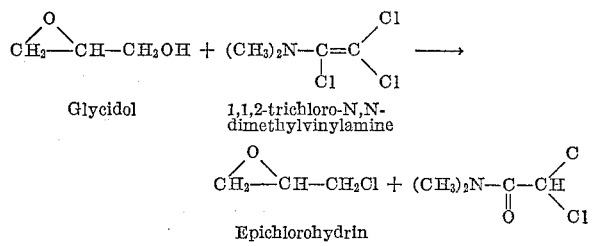

Glycidol    1,1,2-trichloro-N,N-dimethylvinylamine

Epichlorohydrin

The above reaction is merely by way of example since any alcohol whether primary, secondary or tertiary will react with the new vinylamines of this invention in the following manner:

(2)
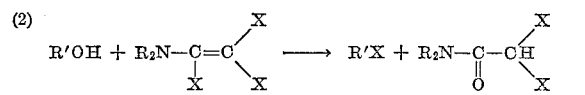

wherein R' represents the negative substituent of any alcohol such as an alkyl radical having 1 to 12 carbon atoms and R and X have the same meaning as R and X, respectively, in Equation 1 above.

This use of the new substituted vinylamine compounds of this invention is actually more comprehensive than shown by Equation 2 above and is applicable to the following type of reaction.

(3)
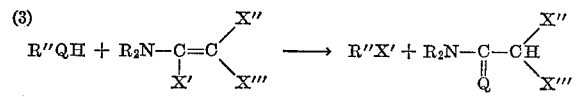

wherein R and X have the same meaning as in Equation 1 above; and Q is a member selected from the group consisting of acyl, alkyl, mercaptyl, and hydrogen radicals. The use of different prime X's indicates that the halogen may be alike or dissimilar. Illustrative of the general nature of Equation 2 above are the following examples.

EXAMPLE XXII

*Ethyl Chloride*

(4)
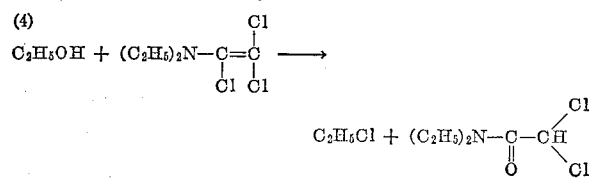

Absolute ethanol (4.61 g., 0.1 mole) was added to 20.25 g. (0.1 mole) of 1,2,2-trichloro-N,N-diethylvinylamine at such a rate that the exothermic reaction was kept between 55–60°. The temperature was raised to 75° for 40 minutes, after the addition (20 minutes) was completed. Ethyl chloride 5.28 g. (82% of theory) was collected during this time. Distillation of the residue yielded 15.93 g. (86.5% of theory) of N,N-diethyl-2,2-dichloroacetamide, B.P. 80–80.5° (1.1 mm. of Hg), $n_D^{25}$ 1.4830.

EXAMPLE XXIII

*2-Butyl Chloride*

(5)
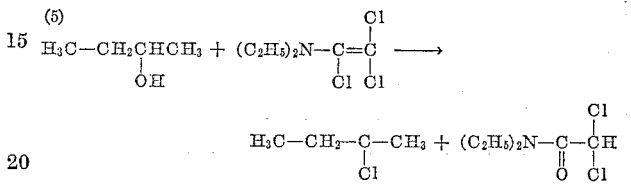

By employing the same procedure as set forth in Example XXII above, but reacting 40.5 g. (0.2 mole) of 1,2,2-trichloro-N,N-diethylvinylamine with 14.8 g. (0.2 mole) of 2-butanol, there was obtained 12.5 g. (68.7 percent of theory) of 2-chlorobutane (B.P. 67–68° C.) and 30.7 g. (83.5 percent of theory) of N,N-diethyl-2,2-dichloroacetamide (B.P. 112° C./9.4 mm. Hg).

EXAMPLE XXIV

*t-Butyl Chloride*

(6)
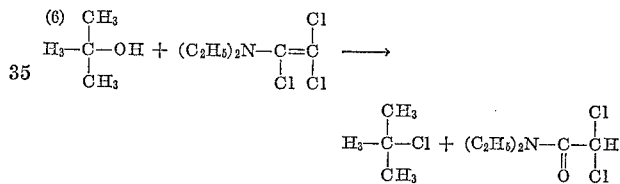

By employing the same procedure as set forth in Example XXIII above, but substituting 14.8 g. (0.2 mole) of t-butanol for the 2-butanol, there was obtained 32.0 g. (87 percent of theory) of N,N-diethyl-2,2-dichloroacetamide (B.P. 115°–117° C./10 mm. Hg) and 10.4 g. (56.2 percent of theory) of t-butyl chloride.

However, if the Reaction 2 is carried out in some solvent such as ether, benzene, hexane, toluene, and the like, an alkyl chloride will still be formed in the case of a primary alcohol but an alkene will be primarily formed in place of the alkyl chloride in the case of secondary and tertiary alcohols. The following examples are given by way of illustration.

EXAMPLE XXV

*Isobutene*

(7)
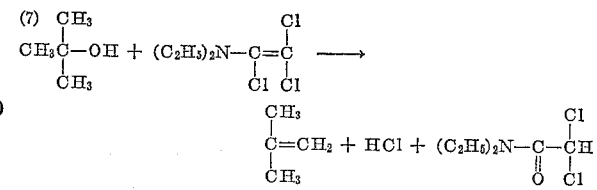

SOLVENT USED

A solution of 20.25 g. (0.1 mole) of 1,2,2-trichloro-N,N-diethylvinylamine, 75 ml. of benzene and 7.41 g. (0.1 mole) of t-butanol are heated at the reflux temperature (82° C.) for three hours. The benzene and unreacted alcohol are removed in vacuo and the residue distilled through a 7 x 300 mm.-spiral wire packed column. A 73 percent of theory, yield is obtained of N,N-diethyl-2,2-dichloroacetamide, but instead of the expected butyl chloride there was obtained isobutene and hydrogen chloride.

EXAMPLE XXVI

2-Butene (8)
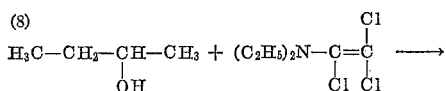

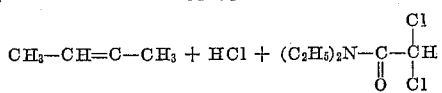

SOLVENT USED

The procedure of Example XXV is repeated except that 7.41 g. (0.1 mole) of 2-butanol are substituted for the t-butanol and 2-butene and N,N-diethyl-2,2-dichloroacetamide are obtained in good yield plus some hydrogen chloride.

Alcohols other than ethanol that can be effectively used in Equation 4 above include methanol, butanol, cyclohexanol, isopropanol, dodecanol, pentanol and the like. Illustrative of Equation 3 above are:

EXAMPLE XXVII

Acetyl Chloride (9)
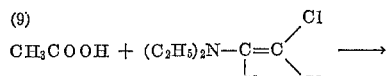

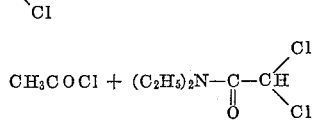

Glacial acetic acid (6.01 g., 0.1 mole) was added dropwise to 20.25 g. (0.1 mole) of 1,2,2-trichloro-N,N-diethylvinylamine. The temperature of the reaction mixture quickly rose to 50°. The rate of addition was then adjusted such that the temperature of the reaction was maintained between 50–60°. The addition required about 20 minutes. Heating was continued for 1.5 hours. Distillation of the reaction mixture afforded 5.66 g. (72.1% of theory) of acetyl chloride, B.P. 48.5–51° and 13.83 g. (75.1% of theory) of N,N-diethyl 2,2-dichloroacetamide, B.P. 75–76° (1.0 mm. of Hg), $n_D^{25}$ 1.4830.

EXAMPLE XXVIII

Benzoyl Chloride

(10)
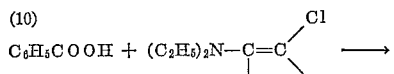

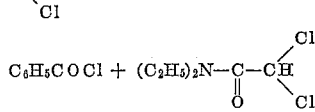

A slurry of benzoic acid (12.21 g., 0.1 mole) and 50 ml. of benzene was added to 20.25 g. (0.1 mole) of 1,2,2-trichloro-N,N-diethylvinylamine in 50 ml. of benzene which was previously heated to 85°. The addition required 15 minutes; however, heating was continued for three hours. After that time the benzene was distilled in vacuo and the residue was fractionated through a 15 x 150 mm. column which was packed with glass helices. The following fractions were collected: (A) 10.15 g., B.P. 75.5–76° (9.5 mm.), $n_D^{25}$ 1.5494; (B) 2.19 g., B.P. 76–87° (9.5 mm.); (C) 5.01 g., B.P. 87–114° (9.5 mm.); (D) 12.27 g., B.P. 114° (9.5 mm.), $n_D^{25}$ 1.4835. Fraction (A) represented at 72.3% yield of benzoyl chloride. Fractions (B) and (C) were mixture of benzoyl chloride and N,N-diethyl 2,2-dichloroacetamide. Fraction (D) represented a 66.6% yield of N,N-diethyl 2,2-dichloroacetamide.

Equations 9 and 10 above are merely illustrative of aliphatic (acetic) and aromatic (benzoic) acids in general which may be used. Other aliphatic acids that may be employed include butyric, caproic, lauric, adipic, malonic, sebacic, succinic acids and the like. Other aromatic acids that may be used include p-toluene sulfonic acid, o-nitro-benzoic acid, m-nitro-sulfonic acid, and the like.

Consistent with Equation 3 above and in the manner taught by Examples XXII, XXIII, XXIV, XXVII and XXVIII above, the following reactions occur with water (11) and a mercaptan (12):

(11)
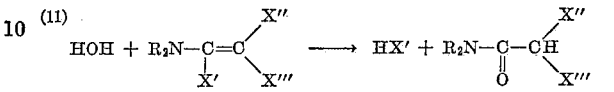

(12)
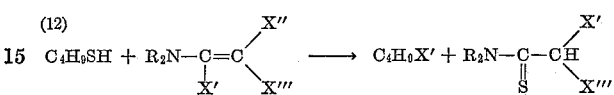

It is obvious that aliphatic mercaptans other than butyl may be used in Equation 12 above such as methyl mercaptan, ethyl mercaptan, pentyl mercaptan, octyl mercaptan, cyclohexyl mercaptan, nonyl mercaptan, and dodecyl mercaptan.

In addition the new compounds of this invention find utility in preparing new amidines, which find use as insecticides, and herbicides, from primary amines. This preparation may be expressed by the following equation:

(13)
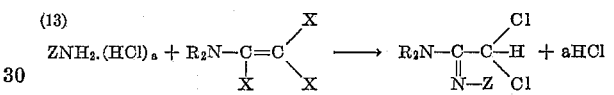

wherein $a$ is 0 or 1 and Z is a hydrocarbon radical. The term "hydrocarbon radical" is used in its broader sense in that a particular Z group can also contain substituents other than carbon and hydrogen, for example, alkoxy, chloro, nitro, and the like which are non-reactive or at least which do not interfere with the desired action of the amine containing the same at the conditions employed. A compound containing a hydrocarbon radical that is substituted with a non-interfering group is the equivalent, for use in the process of the present reaction of the corresponding compound containing the hydrocarbon radical having only carbon and hydrogen.

The utility of the new compounds of this invention to form amidines by reacting with primary amines will be more completely understood by reference to the following examples.

EXAMPLE XXIX

N,N-Diethyl-N'-Phenyl 2,2-Dichloroacetamidine

A mixture of 18.45 g. (0.091 mole) of 1,2,2-trichloro-N,N-diethylvinylamine and 75 ml. of benzene was heated to 60° and then 8.47 g. (0.091 mole) of aniline dissolved in 25 ml. of benzene was added dropwise. The temperature rose quickly to 88°. After refluxing the mixture for 16 hours the benzene was distilled in vacuo. A mobile liquid was decanted from a tacky ether insoluble residue. The tacky substance was washed with ether and the washings added to the decanted liquid. Triethylamine (4 ml.) was added to the ether solution from which was deposited 0.22 g. triethylamine hydrochloride (M.P. 256–257°). About 15 ml. of triethylamine and 30 ml. of ether was added to the tacky residue. The mixture was stirred vigorously for about 10 minutes and filtered. There was obtained an additional 5.58 g. of triethylamine hydrochloride (total yield 5.8 g. 42%). Therefore, 58% of the theoretical amount of hydrogen chloride should have been evolved from the reaction mixture. The filtrate and the first ethereal solution was mixed. The ether and excess triethylamine were distilled in vacuo. The N,N-diethyl-N'-phenyl 2,2-dichloroacetamidine B.P. 88° (0.02 mm. of Hg); $n_D^{25}$ 1.5649; $d^{25}$ 1.1520 was distilled through a 15 x 150 mm. straight tubular column. The yield was 18.87 g. (77.7% of theory).

EXAMPLE XXX

N,N-Diethyl-N'-Tolyl 2,2-Dichloroacetamidine

To a benzene (50 ml.) solution of 20.25 g. (0.1 mole) of 1,2,2-trichloro-N,N-diethylvinylamine at 60° there was added dropwise 10.71 g. (0.1 mole) of p-toluidine in 25 ml. of benzene. The temperature rose to 80° during the addition (10 minutes). A trap of sodium bicarbonate was connected to the reflux condenser in order to trap the hydrogen chloride evolved. The clear reaction mixture was refluxed 4.5 hours. At this time the bicarbonate solution was acidified with conc. nitric acid and then diluted to 100 ml. There was present in the carbonate solution 0.07 mole (theory 0.1 mole) of chloride ion. The benzene was distilled in vacuo. Part of the residue was ether soluble and therefore was dissolved in 50 ml. of ether. The ether insoluble residue was dissolved in 25 ml. of water and the free amidine base liberated with sodium hydroxide pellets. The aqueous solution was extracted with ether and the two ethereal solutions were mixed. After drying the solution with calcium oxide, the ether was removed in vacuo and the amidine was distilled. N,N-diethyl-N'-4-tolyl 2,2-dichloroacetamidine distilled at 87° (0.02 mm. Hg) $n_D^{25}$ 1.5606; yield, 25.06 g. (91.7% of theory).

EXAMPLE XXXI

N,N-Diethyl-N'-p-Chlorophenyl 2,2-Dichloroacetamidine

This preparation was carried out in a manner similar to the preceding example. From 30.38 g. (0.15 mole) of 1,2,2-trichloro-N,N-diethylvinylamine and 19.14 g. (0.15 mole) of p-chloroaniline there was obtained 31.25 g. (65.6 percent of theory) of N,N-diethyl-N'-p-chlorophenyl 2,2-dichloroacetamidine, B.P. 95° C. at 0.02 mm. Hg, $n_D^{25}$ 1.5766.

EXAMPLE XXXII

N,N-Diethyl-N'-n-Butyl-2,2-Dichloroacetamidine (A) A solution consisting of 75 ml. of benzene, 7.31 g. (0.1 mole) of n-butylamine and 20.25 g. (0.1 mole) of 1,2,2-trichloro-N,N'-diethylvinylamine was heated at the reflux temperature (84°) for 20 hours. Hydrogen chloride was not evolved during the reaction period. After this time the reaction mixture was cooled to 25° and filtered. The dried solid weighed 3.13 g. (30%), M.P. 208–209° and was shown to be impure n-butylamine hydrochloride. A mixed melting point determination with an authentic sample of n-butylamine hydrochloride, M.P. 213–214°, was not depressed. The filtrate was concentrated in vacuo and the residue was fractionated through a 15 x 150 mm. glass helices packed column. There was obtained 10.47 g. (51.6%) recovery of the 1,2,2-trichloro-N,N-diethylvinylamine, B.P. 83–86° (20–22 mm. Hg); $n_D^{25}$ 1.4846 and 5.4 g. (22.6% yield), of the desired amidine B.P. 102° (8.1 mm. Hg), $n_D^{25}$ 1.4825.

(B) Repeating the procedure of (A) above, but using 14.62 g. (0.2 mole) of butyl amine, there was obtained after 48 hours at reflux a 44.5 percent yield of theory of N,N-diethyl-N'-n-butyl 2,2-dichloroacetamidine, B.P. 85–87° C. at 1.4 mm. Hg; $n_D^{25}$ 1.4831.

(C) Solid butylamine hydrochloride (10.96 g., 0.1 mole) was added to 20.25 g. (0.1 mole) of 1,2,2-trichloro-N,N-diethylvinylamine dissolved in 50 ml. of benzene at room temperature. Since the reaction was not exothermic, the temperature was slowly raised to 84° and maintained for 24 hours. During this time, hydrogen chloride was evolved at the average rate of 1.99 milliequivalent per hour. The total amount of acid evolved was 47.82 millimoles (theory 100 millimoles). The solvent was decanted from the viscous oily residue. The residue was washed with more benzene which was added to the decanted fraction. From the benzene fractions, there was isolated 5.5 g. (27.9 millimoles) of 1,2,2-trichloro-N,N-diethylvinylamine, B.P. 80° (20 mml.), $n_D^{25}$ 1.4848. The benzene insoluble residue was slurried with 25 ml. of triethylamine and 100 ml. of ether. A mixture of triethylamine and butylamine hydrochloride 12.7 g. (M.P. 197–245°) was isolated. The ethereal-amidine filtrate was concentrated. Distillation of the residue through a 15 x 150 mm. Vigreux column afforded 16.01 g. (67% of theory) of N,N-diethyl-N'-butyl 2,2-dichloroacetamidine, B.P. 73–74° (0.75 mm.), $n_D^{25}$ 1.4832.

Additional amidines prepared from the substituted anilines in accordance with Equation 13 above and Example XXIX above are tabulated below:

TABLE I.—FORMATION OF AMIDINES

| Z-Amine or ZNH$_2$ | Reaction Time, Hours | Yield (percent of theory) | B.p./mm.Hg (M.P.) | $n_D^{25}$ |
|---|---|---|---|---|
| 4-ClC$_6$H$_4$ | 22 | 65.6 | 95° C./.02 | 1.5766 |
| 4-O$_2$NC$_6$H$_4$ | 2.5 | 87.2 | 104.2–105.2° C. | |
| 4-C$_2$H$_5$OC$_6$H$_4$ | 4.5 | 18.9 | 118–119° C./0.06 | 1.5582 |

It is to be noted that the above utility of the new compounds of this invention to form amidines with primary amines does not apply to secondary or tertiary amines under certain circumstances as indicated by the following examples:

EXAMPLE XXXIII

Reaction of Diethylamine and 1,2,2-Trichloro-N,N-Diethylvinylamine

A benzene (75 ml.) solution of 1,2,2-trichloro-N,N-diethylvinylamine (20.25 g., 0.1 mole) of 7.31 g. (0.1 mole) of diethylamine was refluxed 24 hours. After this time, diethylamine and ca. 50 ml. of benzene were distilled through a short Vigreux column. The amine-benzene distillate was saturated with hydrogen chloride after which the benzene was distilled in vacuo. The residue of diethylamine hydrochloride (9.36 g., 85.5%) was washed with ether, filtered, dried and melted at 229.4–230.4°. The remainder of the benzene in the reaction mixture was distilled in vacuo. Distillation of the residue afforded 17.61 g. (87% recovery) of the starting trichlorovinylamine, B.P. 71° (8 mm.) $n_D^{25}$ 1.4850. The recovered trichlorovinylamine (17.3 g., 0.0856 mole) was treated with water and the aqueous layer was titrated potentiometrically for chloride ion. There was found 0.0793 mole (93.6%) of chloride ion. There was isolated from the organic phase 13.85 g. (88%) of N,N-diethyl 2,2-dichloroacetamide B.P. 57° (0.1 mm.), $n_D^{25}$ 1.4830. The amide and trichlorovinylamine were further identified by infrared analysis.

EXAMPLE XXXIV

Reaction of Triethylamine and 1,2,2-Trichloro-N,N-Diethylvinylamine

A mixture of 10.12 g. (0.1 mole) of triethylamine, 20.25 g. (0.1 mole) of 1,2,2-trichloro-N,N-diethylvinylamine and 75 ml. of benzene was refluxed 4 hours. About 0.05 g. of triethylamine hydrochloride was formed during the refluxing period. The benzene and triethylamine were distilled at 25° in vacuo. The residue was distilled at 69–70° (11.0 mm.). There was obtained 17.41 g. (86.2%), $n_D^{25}$ 1.4848 of the starting compound, 1,2,2-trichloro-N,N-diethylvinylamine. This conclusion was based on the boiling point, index of refraction and an exothermic reaction with water. A 94.6% (12.89 g.) recovery of triethylamine as its hydrochloride was obtained by saturation of the benzene distillate with hydrogen chloride.

A further utility of the process of this invention is that it provides a very satisfactory manner in which trivalent phosphorus compounds may be converted into pentavalent phosphorus compounds. Referring to Equation 1 above, trimethyl phosphate, a well known plasticizer, may be readily prepared as follows:

$$CCl_3-\underset{\underset{O}{\|}}{C}-N(C_2H_5)_2 + (CH_3O)_3P \longrightarrow$$

$$\underset{Cl}{\overset{Cl}{>}}C=C\underset{Cl}{\overset{N(C_2H_5)_2}{<}} + (CH_3O)_3PO$$

and triphenyl phosphate, an excellent fire retardant, as follows:

$$CCl_3-\underset{\underset{O}{\|}}{C}-N(CH_3)_2 + (C_6H_5O)_3P \longrightarrow$$

$$\underset{Cl}{\overset{Cl}{>}}C=C\underset{Cl}{\overset{N(CH_3)_2}{<}} + (C_6H_5O)_3PO$$

The new compounds of this invention also find utility as an intermediate in preparing acid salts of compound (a) above in the following manner:

$$\underset{\underset{X}{|}}{R_2N-C=C}\overset{X}{\underset{X}{<}} + HY \longrightarrow \left[\underset{X}{\overset{R_2N}{>}}C-C\underset{X}{\overset{X}{<}}H\right] + Y$$
(a)                    (b)

where Y is an acid radical selected from the group consisting of nitrate, sulfate, bromine, chlorine, and perchlorate. The resulting compound (b) finds application as a biocide and particularly as a herbicide and germicide.

Representative of the manner in which compounds of type (b) above may be prepared are the following examples:

EXAMPLE XXXV

*1,2,2-Trichloro-N,N-Diethylvinylamine Hydrochloride*

An ethereal solution (100 ml.) of 1,2,2-trichloro-N,N-diethylvinylamine (20.25 g., 0.1 mole) was saturated with hydrogen chloride. The resulting solid was filtered and washed with ether. The hydrochloride, M.P. 65–68°, was dried in vacuo and weighed 11.2 g. The filtrate yielded an additional 12.63 g., M.P. 68–69.5°, by concentration in vacuo. The total yield of hydrochloride was 23.83 g. (100% of theory). The entire sample was mixed with ether and again saturated with hydrogen chloride. The melting point of the extremely hydroscopic salt was 68–69.5° (sealed capillary). The infrared spectrum showed a strong peak at 1669 cm.$^{-1}$ shift toward higher frequency from the peak observed in the spectra of the parent trichlorovinylamine.

EXAMPLE XXXVI

*1,2,2-Trichloro-N,N-Diethylvinylamine Perchlorate*

An ether solution of perchloric acid was prepared by shaking ether with 70–72% perchloric acid. The top ethereal layer was added cautiously to an ether solution of 5 g. (0.025 mole) of 1,2,2-trichloro-N,N-diethylvinylamine at room temperature until there was no further precipitation of solids. The precipitated perchlorate salt was filtered and dried; M.P. 137.6–138°, yield 1.75 g. (23.1% of theory). The infrared spectra of the perchlorate salt (1669 cm.$^{-1}$) showed a shift of 57 cm.$^{-1}$ toward a higher frequency from that of the parent compound (1,2,2 - trichloro - N,N - diethylvinylamine, 1612 cm.$^{-1}$).

This application is a continuation-in-part of application Serial No. 802,319, filed March 27, 1959, and now abandoned by Angelo John Speziale and Robert C. Freeman.

While this invention has been described with respect to certain embodiments, it is to be understood that it is not so limited in that variations and modifications thereof obvious to those skilled in the art may be made without departing from the spirit or scope of this invention.

What is claimed is:

1. A compound of the structure $$Y-\underset{\underset{}{}}{\overset{X}{C}}=\underset{\underset{}{}}{\overset{X}{C}}-N\overset{R'}{\underset{R''}{<}}$$

wherein each X substituent is selected from the class consisting of the chlorine and bromine atoms; wherein each of the R' and R'' radicals is selected from the class consisting of aliphatic hydrocarbon radicals having up to 12 carbon atoms, cycloaliphatic hydrocarbon radicals having from 5 to 7 carbon atoms, phenyl, benzyl, radicals such that R' and R'' together comprise an alkylene radical of five to seven carbon atoms, and the said hydrocarbon radicals containing in addition substituents selected from the class consisting of nitro, cyano, alkyl radicals having up to four carbon atoms, alkoxyl radicals having up to four carbon atoms, chlorine and bromine; and wherein Y is a substituent selected from the class consisting of hydrogen, chlorine, bromine, fluorine, alkyl radicals having one to four carbon atoms, and the phenyl radical, provided that when Y is selected from the class consisting of hydrogen and alkyl radicals of up to four carbon atoms, no more than one of the R' and R'' radicals is an aliphatic hydrocarbon radical.

2. A compound of the structure $$\underset{\underset{H}{|}}{\overset{Cl}{C}}=\underset{}{\overset{Cl}{C}}-N\overset{R'}{\underset{R''}{<}}$$

wherein R' and R'' are hydrocarbon radicals of up to 12 carbon atoms, at least one of which contains an alicyclic hydrocarbon ring.

3. A compound of the structure $$\underset{\underset{Cl}{|}}{\overset{Cl}{C}}=\underset{}{\overset{Cl}{C}}-N\overset{R'}{\underset{R''}{<}}$$

wherein R' and R'' are hydrocarbon radicals of up to 12 carbon atoms.

4. A compound of the structure $$\underset{\underset{F}{|}}{\overset{Cl}{C}}=\underset{}{\overset{Cl}{C}}-N\overset{R'}{\underset{R''}{<}}$$

wherein R' and R'' are hydrocarbon radicals of up to 12 carbon atoms, at least one of the R' and R'' radicals contain an alicyclic hydrocarbon ring.

5. 1,2,2-trichloro-N,N-dimethylvinylamine.
6. 1,2,2-trichloro-N,N-diethylvinylamine.
7. 1,2,2-trichloro-N,N-di(n-propyl) vinylamine.
8. 1,2-dichloro-N,N-diphenylvinylamine.
9. α,β-Dichlorostyrylamine.

10. The method of preparing a compound of the structure $$Y-\underset{\underset{}{}}{\overset{X}{C}}=\underset{\underset{}{}}{\overset{X}{C}}-N\overset{R'}{\underset{R''}{<}}$$

wherein each X substituent is selected from the class consisting of the chlorine and bromine atoms; wherein each of the R' and R'' radicals is selected from the class consisting of aliphatic hydrocarbon radicals having up to 12 carbon atoms, cycloaliphatic hydrocarbon radicals having from 5 to 7 carbon atoms, phenyl, benzyl, radicals such that R' and R'' together comprise an alkylene radical of five to seven carbon atoms, and the said hydrocarbon radicals containing in addition substituents selected from the class consisting of nitro, cyano, alkyl radicals having up to four carbon atoms, alkoxyl radicals having up to four carbon atoms, chlorine and bromine; and wherein Y is a substituent selected from the class consisting of hydrogen, chlorine, bromine, fluorine, alkyl radicals having one to four carbon atoms, and the phenyl radical, provided that when Y is selected from the class consisting of hydrogen and alkyl radicals of up to four carbon atoms, no more than one of the R' and R" radicals is an aliphatic hydrocarbon radical, which comprises heating a compound of the structure

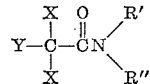

in the presence of a trivalent phosphorus compound of the structure

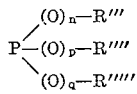

wherein n, p and q are integers from zero to one and wherein R''', R'''' and R''''' are radicals selected from the class consisting of the aliphatic hydrocarbon radicals having up to 12 carbon atoms, the cycloaliphatic hydrocarbon radicals having from 5 to 7 carbon atoms, the aromatic hydrocarbon radicals selected from the class consisting of phenyl and naphthyl, and the said hydrocarbon radicals having substituents selected from the class consisting of chlorine, bromine, nitro, cyano, alkyl radicals having up to four carbon atoms and alkoxy radicals having up to four carbon atoms.

11. The method of preparing a compound of the structure

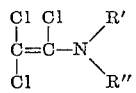

wherein R' and R" are hydrocarbon radicals of up to 12 carbon atoms, which comprises heating a compound of the structure

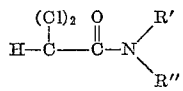

in the presence of a tertiary phosphine.

12. The method of preparing a compound of the structure

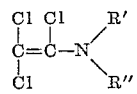

wherein R' and R" are hydrocarbon radicals of up to 12 carbon atoms, which comprises heating a compound of the structure

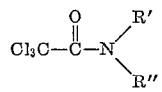

in the presence of a tertiary phosphine.

13. The method of preparing a compound of the structure

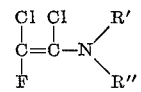

wherein R' and R" are hydrocarbon radicals of up to 12 carbon atoms, at least one of the R' and R" radicals contain in alicyclic hydrocarbon ring; which comprises heating

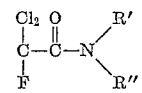

in the presence of a tertiary phosphine.

14. The method of preparing 1,2,2-trichloro N,N-dimethylvinylamine which comprises heating 2,2,2-trichloro N,N-dimethylacetamide in the presence of a tertiary phosphine.

15. The method of preparing 1,2,2-trichloro N,N-diethylvinylamine which comprises heating 2,2,2-trichloro N,N-diethylacetamide in the presence of a tertiary phosphine.

16. The method of preparing 1,2,2-trichloro N,N-dipropylvinylamine which comprises heating 2,2,2-trichloro N,N-dipropylacetamide in the presence of a tertiary phosphine.

17. The method of preparing 1,2,2-trichloro N,N-diphenylvinylamine which comprises heating 2,2,2-trichloro N,N-diphenylacetamide in the presence of a tertiary phosphine.

18. The method of preparing 1,2,2-trichloro N,N-dibutylvinylamine which comprises heating 2,2,2-trichloro N,N-dibutylacetamide in the presence of a tertiary phosphine.

References Cited in the file of this patent
UNITED STATES PATENTS 2,751,414    Miller _____ June 19, 1956
2,891,064    Kundiger et al. _____ June 16, 1959

OTHER REFERENCES

Ott et al.: Berichte, vol. 76B, pages 84–8 (1943).